(12) United States Patent
Lee et al.

(10) Patent No.: US 8,464,331 B2
(45) Date of Patent: Jun. 11, 2013

(54) DATA TRANSMISSION MANAGEMENT SERVER AND METHOD

(75) Inventors: Chi-Feng Lee, Tu-Cheng (TW); Ming-Chin Ho, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 202 days.

(21) Appl. No.: 13/039,325

(22) Filed: Mar. 3, 2011

(65) Prior Publication Data

US 2012/0110655 A1 May 3, 2012

(30) Foreign Application Priority Data

Oct. 29, 2010 (CN) .......................... 2010 1 0525018

(51) Int. Cl.
*H04L 29/06* (2006.01)
(52) U.S. Cl.
USPC .......... 726/12; 726/3; 726/15; 713/152; 713/153; 713/161; 709/200; 709/217; 709/223; 709/224; 709/225
(58) Field of Classification Search
USPC ................................................ 726/12
See application file for complete search history.

(56) References Cited

U.S. PATENT DOCUMENTS

| | | | |
|---|---|---|---|
| 6,079,020 A * | 6/2000 | Liu | 726/15 |
| 7,028,333 B2 * | 4/2006 | Tuomenoksa et al. | 726/3 |
| 7,992,201 B2 * | 8/2011 | Aldridge et al. | 726/15 |
| 2008/0162924 A1 | 7/2008 | Chinitz et al. | |

OTHER PUBLICATIONS

Torsten Braun, Manuel Guenter, and Ibrahim Khalil. "Management of Quality of Service Enabled VPNs." Communications Magazine, IEEE. vol. 39, Issue: 5 [2001]: pp. 122-131.*

* cited by examiner

*Primary Examiner* — Taghi Arani
*Assistant Examiner* — Narciso Victoria
(74) *Attorney, Agent, or Firm* — Altis Law Group, Inc.

(57) ABSTRACT

A data transmission management server for managing a terminal device to access a network resource providing server by a source gateway in a virtual private network (VPN) obtains current resource information of a plurality of gateways in the VPN periodically. The data transmission management server selects one from the gateways as a destination gateway according to the resource information, transmits an internet protocol address of the destination gateway to the source gateway to make the source gateway establish a secure communication tunnel to the selected destination gateway and access the network resource providing server over the secure communication tunnel.

14 Claims, 5 Drawing Sheets

DATA TRANSMISSION MANAGEMENT SERVER AND METHOD

BACKGROUND

1. Technical Field

Embodiments of the present disclosure relate to data transmission technology, and more particularly to a data transmission management server and a method to manage data transmission in the Internet.

2. Description of Related Art

More and more network terminal devices are required to access resources from servers on the Internet, such as access cloud data, download point to point data. However, when those data are uploaded on the Internet, secure protections against Trojan programs are necessary. Currently, a virtual private network is used for providing the secure protection. Two gateways, including a source gateway and a destination gateway in the virtual private network, establish a secure communication tunnel to transmit data between two network terminal devices which respectively are located in a local area network of one of the two gateways. The secure communication tunnel can protect the uploaded data against the Trojan programs.

However, during the establishment of the virtual private network, the source gateway must know an internet protocol address of the destination gateway and must be manually configured before connecting to the destination gateway, which is rather inconvenient. However, if the destination gateway is too busy to serve the source gateway, the source gateway has to wait a long time or change to another destination gateway. There remains a heretofore unaddressed need to overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated over, software code modules executed by one or more general purpose computers or processors. The code modules may be stored in any type of computer-readable medium or other storage device. Some or all of the methods may alternatively be embodied in specialized computer hardware or communication apparatus.

Figure 1:
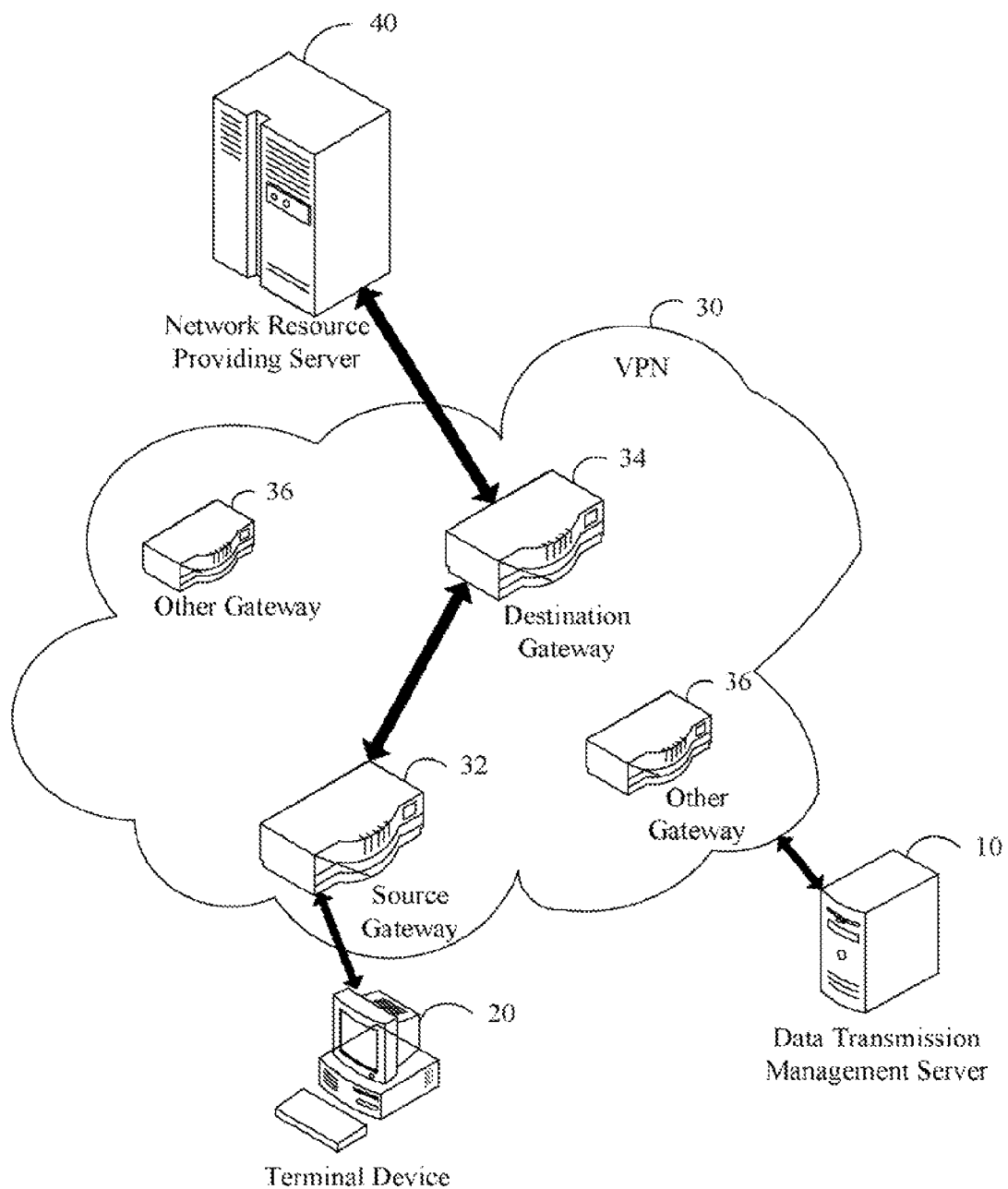
FIG. 1 is a schematic diagram of environment of one embodiment a data transmission management server of the present disclosure.

FIG. 1 is a schematic diagram of an application environment of one embodiment of a data transmission management server 10 of the present disclosure. In one embodiment, the data transmission management server 10 manages a terminal device 20 to access a network resource providing server 40 over a virtual private network (VPN) 30. The network resource providing server 40 provides network resource for the terminal device 20, such as emails, video data, and documents.

A plurality of gateways 32-36 are located in the virtual private network 30. In one embodiment, one of the gateways 32-36 in the virtual private network 30 which is located nearest to the terminal device 20 is called the source gateway, such as the gateway 32. The terminal device 20 connects to the virtual private network 30 by the source gateway 32. The data transmission management server 10 selects one of the gateways as a destination gateway to the terminal device 20 to access the network resource providing server 40. The source gateway 32 automatically establishes a secure communication tunnel to the destination gateway 34.

Subsequently, the terminal device 20 accesses network resources from the network resource providing server 40 over the secure communication tunnel. By the mechanism of the secure communication tunnel, the network resources transmitted on the virtual private network 30 is safe. The source gateway 32, the destination gateway 34, and the data transmission management server 10 communicate with each other over secure communication tunnels in the virtual private network 30.

In one embodiment, the virtual private network 30 is a secure sockets layer virtual private network. The data transmission management server 10 communicates with each of the plurality of gateways 32, 34, 36 over secure communication tunnels of the secure sockets layer virtual private network 30 to improve secure level.

Figure 2:
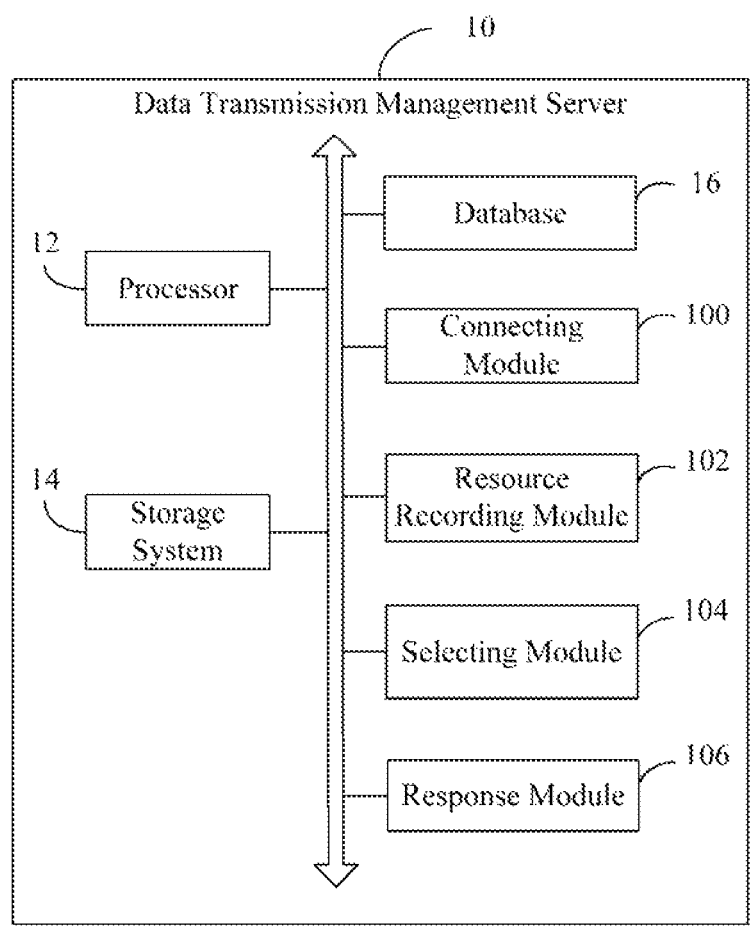
FIG. 2 is a schematic diagram of functional modules of one embodiment of the data transmission management server of FIG. 1.
Figure 3:
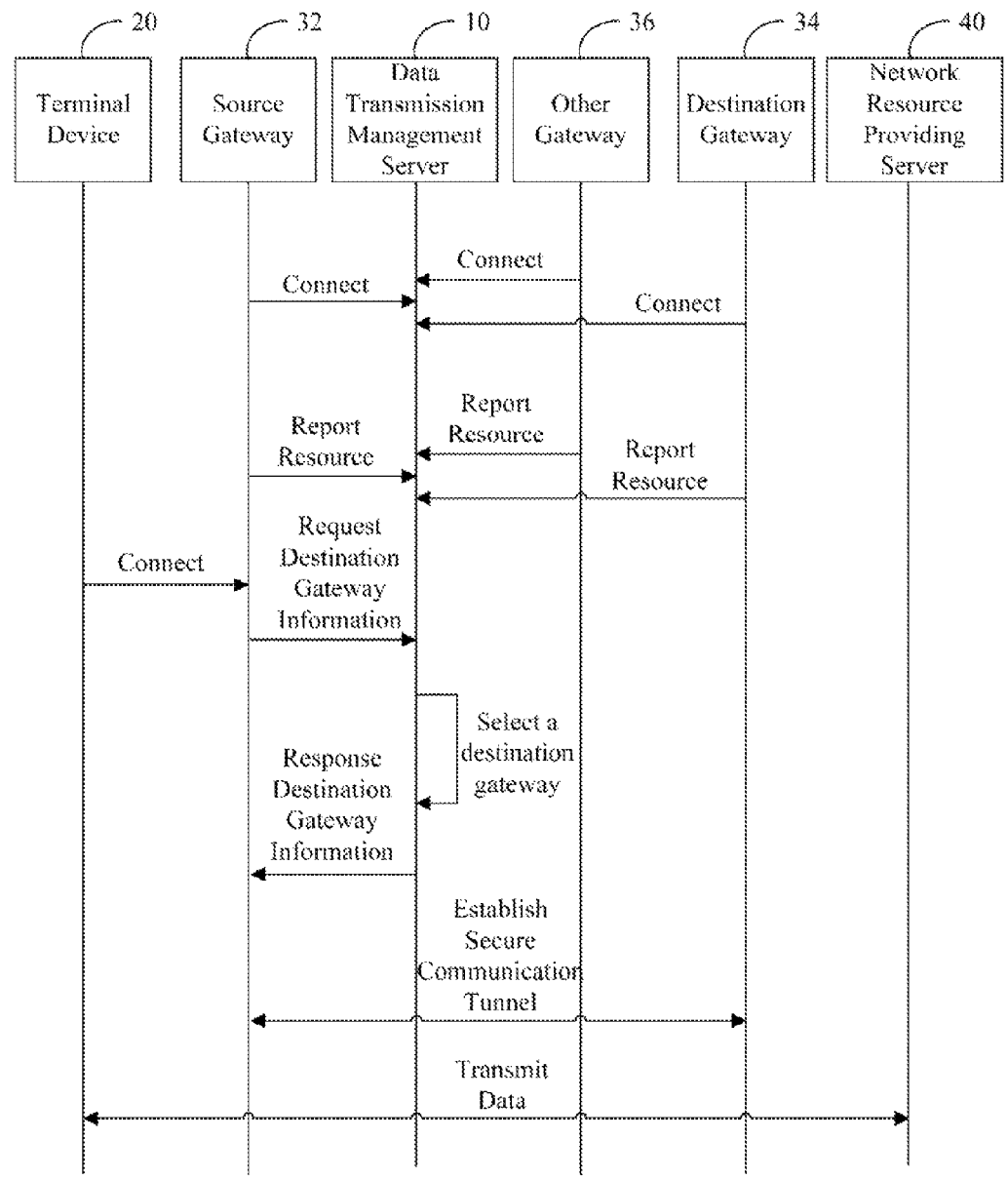
FIG. 3 is a schematic diagram of the data transmission management server of FIG. 1 managing data transmission.

FIG. 2 is a schematic diagram of functional modules of one embodiment of a data transmission management server 10 of the present disclosure. FIG. 3 is a schematic diagram of the data transmission management server 10 of FIG. 1 managing data transmission.

In one embodiment, the data transmission management server 10 includes a processor 12, a storage system 14, a database 16, a connecting module 100, a resource recording module 102, a selecting module 104, and a response module 106. The connecting module 100, the resource recording module 102, the selecting module 104, and the response module 106 may comprise computerized codes in the form of one or more programs that are stored in the storage system 14. The computerized codes include instructions that are executed by the processor 12 to provide functions for those modules 100-106.

Referring to FIG. 3, each of the plurality of gateways 32-36 connects to the data transmission management server 10 firstly. Then, the connecting module 100 of the data transmission management serve 10 verifies the connection of the plurality of gateways 32-36 in the virtual private network 30. If one of the gateways 32-36 successfully connects to the data transmission management server 10, the connecting module 100 records the connected gateway in the database 16.

After finishing the connection, each of the connected gateways 32-36 periodically reports current resource information of the gateways 32-36 to the data transmission management server 10. In one embodiment, the resource information of each of the gateways 32-36 indicates a plurality of parameters which describes current working condition of corresponding one of the gateways 32-36, such as a bandwidth utility rate, a processor utility rate, and a secure protection capability. The secure protection capability indicates whether the gateway employs a firewall, a Trojan programs detection and protection system, or any other secure mechanisms. By checking those parameters, it can be determined whether the gateways can transmit new data or not.

The resource recording module 102 obtains current resource information from each of the connected gateways 32-36 periodically, and updates the database 16 according to the resource information corresponding to the connected gateways 32-36 recorded in the database 16. It should be noted that each of the plurality of gateways 32-36 reports the resource information to the resource recording module 102 timely after the resource information of the gateway is changed, so that the resource recording module 102 updates the database 16 timely after the resource information of the gateway is changed.

When the terminal device 20 is required to access network resources from the network resource providing server 40, the terminal device 20 connects to one of the gateways 32-36 which is physically nearest to the terminal device 20, such as the source gateway 32. Then, the terminal device 20 transmits an accessing request to the source gateway 32. In one embodiment, the accessing request includes information of the network resource providing server 40 to be accessed, such as an internet protocol address of the network resource providing server 40.

After receiving the accessing request, the source gateway 32 establishes a secure communication tunnel to the data transmission management server 10 and transmits a destination gateway information request to the data transmission management server 10 over the secure communication tunnel to require the data transmission management distributing a destination gateway for the terminal device 20.

The selecting module 102 of the data transmission management server 10 receives the destination gateway information request from the source gateway 32. Then, the selecting module 102 selects one gateway from the connected gateways 32-36, such as the destination gateway 34, according to the resource information recorded in the database 16.

After selecting the destination gateway 34, the selecting module 102 obtains an internet protocol address of the destination gateway 34. The response module 106 transmits the internet protocol address of the destination gateway 34 to the source gateway 32 to make the source gateway 32 establish a secure communication tunnel to the obtained destination gateway 34 and access the network resource providing server 40 over the secure communication tunnel.

After receiving the internet protocol address of the destination gateway 34, the source gateway 32 establishes a transmission secure communication tunnel to the obtained destination gateway 34, so that the terminal device 20 and the network resource providing server 40 can transmit data to each other over the transmission secure communication tunnel.

In one embodiment, to obtain the destination gateway 34, the selecting module 104 requests for physical distance between each of the connected gateways 32-36 and the network resource providing server 40 from each of the connected gateways 32-36. The selecting module 104 receives the physical distance from each of the connected gateways 32-36 and records the physical distance corresponding to each of the connected gateways 32-36 in the database 16.

As such, when the terminal device 20 accesses the network resource providing server 40 again, the selecting module 104 doesn't need to request physical distance from each of the connected gateways, but directly read the physical distance from the database 16.

However, in practice, some gateways may be located too far away from the network resource providing server 40 to be the destination gateway 34, and processors of some gateways are too busy to process more data transmission. Then, the selecting module 104 queries the resource information and the physical distance from the database 16 to obtain suitable gateways according to a defined criterion. In detail, the selecting module 104 predefines the defined criterion and matches the resource information and physical distance in the database 16 with the defined criterion to find the suitable gateways.

In one embodiment, the defined criterion includes the physical distance between the connected gateway and the network resource providing server 40 is less than a predetermined physical distance value, the bandwidth utility rate of the connected gateway is less than a predetermined bandwidth value, the processor utility rate of the connected gateway is less than a predetermined utility value, and the secure protection capability of the connected gateway is higher than a predetermined capability value.

Therefore, the selecting module 104 considers every aspects of performance of the gateways, which omits those gateways best in one aspect but worse in other aspects, such as a gateway whose processor utility rate is lowest but is located rather far away from the network resource providing server 40.

The selecting module 102 selects one gateway from the suitable gateways 32-36, such as the gateway 34, as the destination gateway. In detail, the selecting module 102 can employ several methods to select one gateway from the suitable gateways as the destination gateway, such as a fastest first method, a shortest first method, or a safest first method.

In detail, the fastest first method indicates selecting one gateway with lowest bandwidth utility rate and lowest processor utility rate from the suitable gateways. The one gateway selected from the suitable gateways by the fastest first method can fastest process data transmission than other gateways. The shortest first method indicates selecting one gateway with shortest physical distance to the network resource providing server 40 from the suitable gateways. The safest first method indicates selecting one gateway with highest secure protection capability from the suitable gateways.

Figure 4:
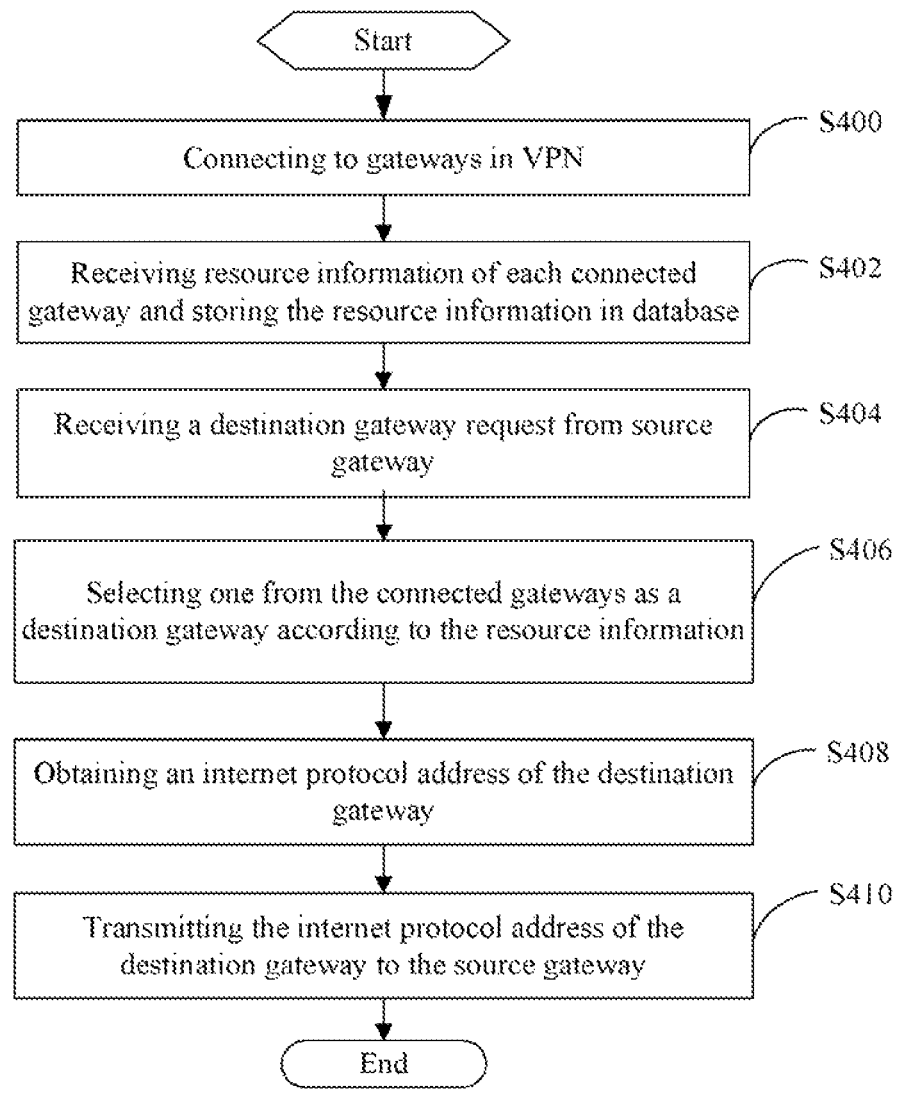
FIG. 4 is a flowchart of one embodiment of data transmission management method of the present disclosure.

FIG. 4 is a flowchart of one embodiment of data transmission management method of the present disclosure. The flowchart is executed by the modules of the data transmission management server 10 of FIG. 1 and FIG. 2. Depending on the embodiment, additional blocks may be added, others deleted, and the ordering of blocks may be changed while remaining well within the scope of the disclosure.

Firstly, each of the plurality of gateways 32-36 connects to the data transmission management server 10. Then, in block S400, the connecting module 100 of the data transmission management serve 10 verifies the connection of the plurality of gateways 32, 34, 36 in the virtual private network 30. In block S402, the resource recording module 102 obtains current resource information of the connected gateways 32-36 from each of the connected gateways periodically, and updates the database 16 according to the resource information of the connected gateways 32-36 recorded in the database 16.

In one embodiment, the resource information corresponding to one of the gateways 32-36 indicates a plurality of parameters which describes current working condition of the one of the gateways 32-36, such as a bandwidth utility rate, a processor utility rate, and a secure protection capability. The secure protection capability indicates whether the gateway employs a firewall, Trojan programs detection and protection system, or any other secure mechanisms. By checking those parameters, it can be determined whether the gateways can transmit new data or not.

In block S404, the selecting module 102 of the data transmission management server 10 receives a request for destination gateway information from the source gateway 32. In block S406, the selecting module 102 selects one from the connected gateways as the destination gateway 34 according to the resource information recorded in the database 16. Then, in block S408, the selecting module 102 obtains an internet protocol address of the destination gateway 34.

In block S410, The response module 106 transmits the internet protocol address of the destination gateway 34 to the source gateway 32 to make the source gateway 32 establish a secure communication tunnel to the obtained destination gateway 34 and access the network resource providing server 40 over the secure communication tunnel. After receiving the internet protocol address of the destination gateway 34, the source gateway 32 establishes a secure communication tunnel to the obtained destination gateway 34, and the terminal device 20 and the network resource providing server 40 transmit data to each other over the secure communication tunnel.

Figure 5:
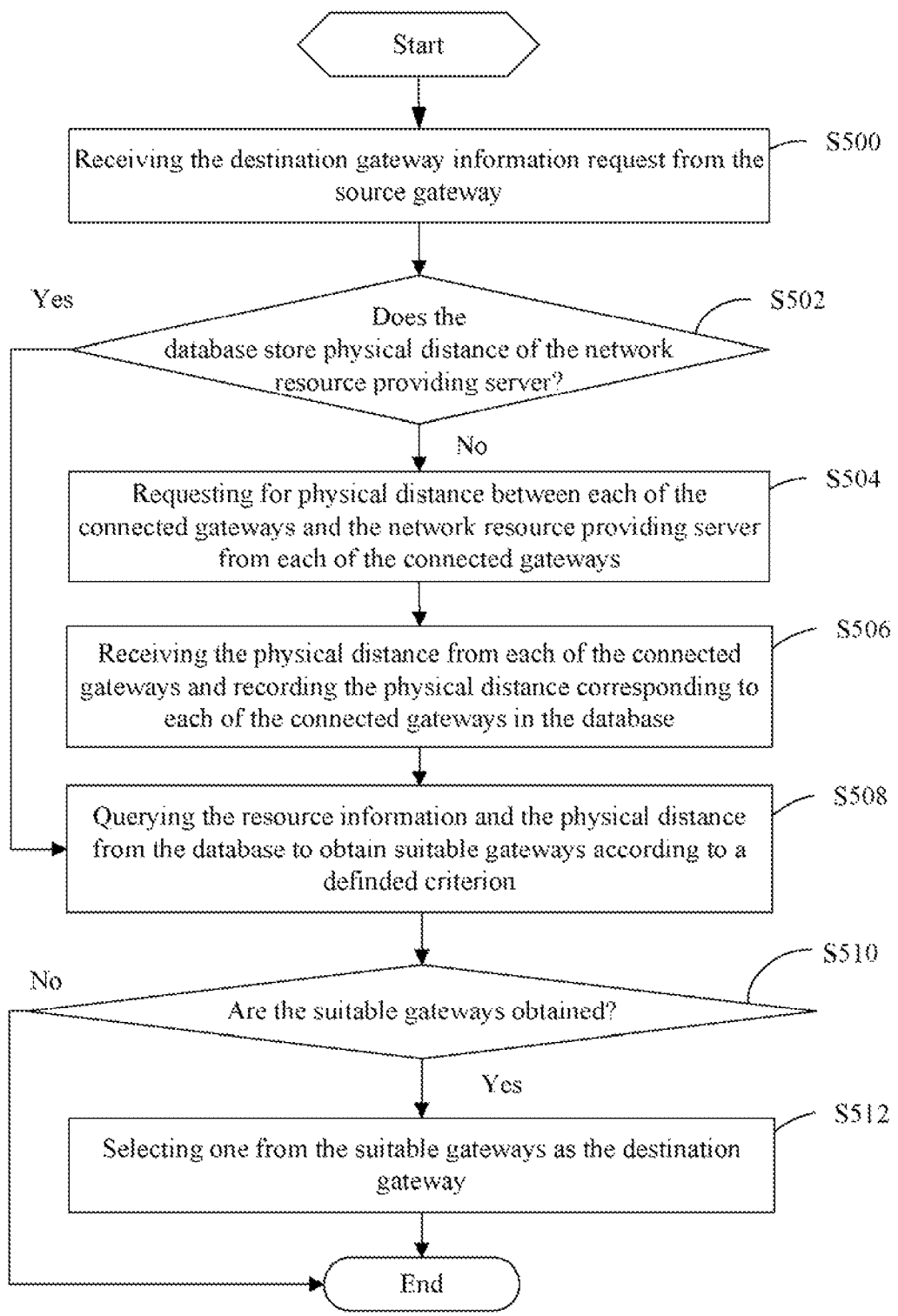
FIG. 5 is a detail flowchart of one embodiment of block S406 selecting a destination gateway of FIG. 4.

FIG. 5 is a flowchart of one embodiment of block S406 of FIG. 4. The flowchart is executed by the data transmission management server 10 of FIG. 1 and by the selecting module 104 of FIG. 2. Depending on the embodiment, additional blocks may be added, others deleted, and the ordering of blocks may be changed while remaining well within the scope of the disclosure.

The terminal device 20 transmits an accessing request to the source gateway 32 when the terminal device 20 is required to access network resource, such as download a file from a computer in the internet. After receiving the accessing request, the source gateway 32 establishes a secure communication tunnel to the data transmission management server 10 and transmits a destination gateway information request to the data transmission management server 10 to require the data transmission management distributing a destination gateway for the terminal device 20.

As such, in block S500, the selecting module 102 of the data transmission management server 10 receives the destination gateway information request from the source gateway 32. In block S502, the selecting module 102 determines if the database 16 stores physical distance of the network resource providing server 40. If the database 16 does not store physical distance of the network resource providing server 40, then in block S504, the selecting module 104 requests for physical distance between each of the connected gateways and the network resource providing server 40 from each of the connected gateways.

The connected gateways response the physical distance to the data transmission management server 10 after receiving the request from the selecting module 104. Then, in block S506, the selecting module 104 receives the physical distance from each of the connected gateways 32-36 and records the physical distance corresponding to each of the connected gateways 32-36 in the database 16. As such, the database 16 stores the physical distance of the network resource management server 40. Then, in block S508, the selecting module 104 queries the resource information and the physical distance from the database 16 to obtain suitable gateways according to a defined criterion.

In one embodiment, the defined criterion for obtaining the suitable gateways from the connected gateways 32-36 includes the physical distance between the connected gateway and the network resource providing server 40 is less than a predetermined physical distance value, the bandwidth utility rate of the connected gateway is less than a predetermined bandwidth value, the processor utility rate of the connected gateway is less than a predetermined utility value, and the secure protection capability of the connected gateway is higher than a predetermined capability value.

In block S510, the selecting module 104 determines if the suitable gateways are obtained. If the suitable gateways are obtained, in block S512, the selecting module 104 selects one gateway from the suitable gateways, such as the gateway 34, as the destination gateway. In detail, the selecting module 102 can employ several methods to select one gateway from the suitable gateways as the destination gateway, such as a fastest first method, a shortest first method, or a safest first method.

The fastest first method indicates selecting one gateway with lowest bandwidth utility rate and lowest processor utility rate from the suitable gateways. The one gateway selected from the suitable gateways by the fastest first method can process data transmission than other gateways fastest. The shortest first method indicates selecting one gateway with shortest physical distance to the network resource providing server 40 from the suitable gateways. The safest first method indicates selecting one gateway with highest secure protection capability from the suitable gateways.

Therefore, under the management of the data transmission management server 10 and method of the present disclosure, the terminal device 20 can access the network resource providing server 40 over a secure communication tunnel. The terminal device 20 doesn't need to know the internet protocol address of the destination gateway 34, to install any software, or to preset any parameter. Furthermore, if the destination gateway 34 were damaged, the data transmission management server 10 can select another destination gateway to the terminal device 20.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A data transmission management server for managing a terminal device to access a network resource providing server over a virtual private network linking a plurality of gateways and the terminal device connecting to the virtual private network by a source gateway among the plurality of gateways, the data transmission management server comprising:
  a processor; and
  a storage system storing computerized codes in the form of one or more programs operable to be executed by the processor, the one or more programs comprising:
    a connecting module connecting to the plurality of gateways in the virtual private network, and recording the connected gateways in a database;
    a resource recording module obtaining current resource information of the connected gateways from each of the connected gateways periodically and updating the database according to the resource information corresponding to the connected gateways;
    a selecting module selecting a destination gateway from the connected gateways according to the resource information recorded in the database, distributing the destination gateway to the terminal device, and obtaining an internet protocol address of the destination gateway when a request is received from the source gateway; and
    a response module transmitting the internet protocol address of the destination gateway to the source gateway;
    wherein the source gateway establishes a secure communication tunnel to the obtained destination gateway and accesses the network resource providing server over the secure communication tunnel.

2. The data transmission management server as claimed in claim 1, wherein the virtual private network is a secure sockets layer virtual private network, and the data transmission management server communicates with each of the plurality of gateways over secure communication tunnels of the secure sockets layer virtual private network.

3. The data transmission management server as claimed in claim 1, wherein the resource information corresponding to one of the gateways comprises a bandwidth utility rate, a processor utility rate, and a secure protection capability.

4. The data transmission management server as claimed in claim 3, wherein the selecting module requests physical distance between each of the connected gateways and the network resource providing server from each of the connected gateways.

5. The data transmission management server as claimed in claim 4, wherein the selecting module receives the physical distance from each of the connected gateways and records the physical distance corresponding to each of the connected gateways in the database.

6. The data transmission management server as claimed in claim 5, wherein the selecting module queries the resource information and the physical distance from the database to obtain suitable gateways according to a defined criterion and selects one from the suitable gateways as the destination gateway.

7. The data transmission management server as claimed in claim 6, wherein the defined criterion comprises: the physical distance between the connected gateway and the network resource providing gateway is less than a predetermined physical distance value, the bandwidth utility rate of the connected gateway is less than a predetermined bandwidth value, the processor utility rate of the connected gateway is less than a predetermined utility value, and the secure protection capability of the connected gateway is higher than a predetermined capability value.

8. The data transmission management server as claimed in claim 7, wherein the selecting module employs a fastest first method, a shortest first method, or a safest first method to select one from the suitable gateways as the destination gateway, wherein the fastest first method indicates selecting one gateway with lowest bandwidth utility rate and lowest processor utility rate from the suitable gateways, the shortest first method indicates selecting one gateway with shortest physical distance from the suitable gateways, the safest first method indicates selecting one gateway with highest secure protection capability from the suitable gateways.

9. A data transmission management method for a data transmission management server managing a terminal device to access a network resource providing server over a virtual private network linking a plurality of gateways and the terminal device connecting to the virtual private network by a source gateway among the plurality of gateways, the method comprising:
  connecting to the plurality of gateways in the virtual private network and recording the connected gateways in a database;
  obtaining current resource information of the connected gateways from each of the connected gateways periodically and updating the database according to the resource information corresponding to the connected gateways recorded in the database;
  receiving a request from the source gateway to inquire destination gateway information;
  selecting a destination gateway from the connected gateways according to the resource information recorded in the database, distributing the destination gateway to the terminal device, and obtaining an internet protocol address of the destination gateway; and
  transmitting the internet protocol address of the destination gateway to the source gateway to make the source gateway establish a secure communication tunnel to the obtained destination gateway and access the network resource providing server over the secure communication tunnel.

10. The data transmission management method as claimed in claim 9, wherein the virtual private network is a secure sockets layer virtual private network and the data transmission management server communicates with each of the plurality of gateways over secure communication tunnels of the secure sockets layer virtual private network.

11. The data transmission management method as claimed in claim 9, wherein the resource information corresponding to one of the gateways comprises a bandwidth utility rate, a processor utility rate, and a secure protection capability.

12. The data transmission management method as claimed in claim 11, wherein selecting a destination gateway according to the resource information comprises:
  requesting for physical distance between each of the connected gateways and the network resource providing server from each of the connected gateways;
  receiving the physical distance from each of the connected gateways and recording the physical distance corresponding to each of the connected gateways;
  querying the resource information and the physical distance from the database to obtain suitable gateways according to a defined criterion; and
  selecting one from the suitable gateways as the destination gateway.

13. The data transmission management method as claimed in claim 12, wherein the defined criterion comprises: the physical distance between the connected gateway and the network resource providing gateway is less than a predetermined physical distance value, the bandwidth utility rate of the connected gateway is less than a predetermined bandwidth value, the processor utility rate of the connected gateway is less than a predetermined utility value, and the secure protection capability of the connected gateway is higher than a predetermined capability value.

14. The data transmission management method as claimed in claim 13, further comprising: employing a fastest first method, a shortest first method, or a safest first method to select one from the suitable gateways as the destination gateway, wherein the fastest first method indicates selecting one gateway with lowest bandwidth utility rate and lowest processor utility rate from the suitable gateways, the shortest first method indicates selecting one gateway with shortest physical distance from the suitable gateways, the safest first method indicates selecting one gateway with highest secure protection capability from the suitable gateways.

* * * * *